(12) United States Patent  (10) Patent No.: US 7,461,858 B2
Hirata  (45) Date of Patent: Dec. 9, 2008

(54) CURTAIN AIRBAG DEVICE

(75) Inventor: Motoharu Hirata, Hiroshima (JP)

(73) Assignee: Mazda Motor Corporation (JP)

( * ) Notice: Subject to any disclaimer, the term of this patent is extended or adjusted under 35 U.S.C. 154(b) by 343 days.

(21) Appl. No.: 11/358,219

(22) Filed: Feb. 22, 2006

(65) Prior Publication Data

US 2006/0214401 A1  Sep. 28, 2006

(30) Foreign Application Priority Data

Mar. 28, 2005 (JP) ............... 2005-092435
Mar. 28, 2005 (JP) ............... 2005-092436

(51) Int. Cl.
B60R 21/16 (2006.01)
(52) U.S. Cl. .................. 280/730.2
(58) Field of Classification Search ............. 280/730.2, 280/743.2, 749, 730.1
See application file for complete search history.

(56) References Cited

U.S. PATENT DOCUMENTS 3,774,936 A    11/1973  Barnett et al.
5,462,308 A  * 10/1995  Seki et al. ................ 280/749
5,975,566 A  * 11/1999  Bocker et al. ........... 280/730.2
6,168,194 B1 *  1/2001  Cuevas et al. ........... 280/730.2
6,241,277 B1 *  6/2001  Heigl et al. .............. 280/730.2
6,273,458 B1 *  8/2001  Steffens et al. .......... 280/730.2
6,308,982 B1 * 10/2001  Wallner et al. .......... 280/730.2
6,347,807 B1 *  2/2002  Schink et al. ............ 280/730.2
6,375,216 B1 *  4/2002  Eschbach ................. 280/730.1
6,431,588 B1 *  8/2002  Bayley et al. ............ 280/730.2
2004/0066022 A1  4/2004  Mori et al.

FOREIGN PATENT DOCUMENTS

DE    19704051 A1 *  8/1998
DE    19841347 A1     3/2000
WO    WO 03/086822 A1  10/2003

* cited by examiner

Primary Examiner—Faye M. Fleming
(74) Attorney, Agent, or Firm—Studebaker & Brackett PC; Donald R. Studebaker

(57) ABSTRACT

When the airbag portion is inflated, the tip portions of the curtain portion are moved downward and thereby the tension portions connected by the bands are pulled down to the position of the support pins as shown in FIG. 6B. Thus, the tension can be provided to the curtain portion at a portion between the support pins with the length V between the right-side tension portion and the left-side tension portion, which is shorter than the three-side length (X+Y+Z).

14 Claims, 15 Drawing Sheets

Vehicle Front ←

Vehicle Front ←

CURTAIN AIRBAG DEVICE

BACKGROUND OF THE INVENTION

The present invention relates to a curtain airbag device, in particular to the curtain airbag device that is applicable to a vehicle, building, air craft, train, ship, space vehicle, space station etc., and that is operative to be inflated so as to promptly cover an opening portion such as a window or a door (hereinafter, referred to as a window portion).

Conventionally, the curtain airbag device that is inflated in a curtain shape to cover the window portion promptly is known.

This curtain airbag device is operative such that an airbag is placed in a folded state at a periphery of the window portion, and in a specified situation (for example, at the vehicle crash) the airbag is inflated so as to cover the window portion.

Herein, it is generally necessary to provide a specified tension to the curtain-shaped inflated airbag in order to cover the window portion properly, so it has been important how such tension could be provided.

In a conventional curtain airbag device that is applied to a rectangular window portion, a base portion of the airbag is attached to three sides of the window periphery and an inflatable portion (gas chamber) is formed at a free-end portion of the airbag, wherein the inflatable portion can be inflated by gas supplied so as to make the length of the free-end portion shorter apparently, thereby generating the tension.

This conventional way of generating the tension, however, would require a relatively large volume of the inflatable airbag portion to cover the large window portion properly and lots of gas to inflate the large inflatable airbag. Thus, the window area that could be covered properly has a limit.

U.S. patent application Publication Ser No. 2004/0066022 A1 discloses the curtain airbag device for the vehicle back window, in which the curtain portion is placed in the folded state at the upper peripheral portion of the back window and the tension-providing support points are provided respectively at the middle portion of the both-side peripheral portions of the back window, wherein the curtain portion is inflated downward from the tension-providing support points, thereby generating the tension.

The above-described patent publication also discloses another curtain airbag device, in which there are provided guide rails extending vertically at the both-end portions of the back window, wherein the curtain portion placed at the upper peripheral portion is moved down along the guide rails, thereby generating the tension by changing the fixed position (support position) of the curtain portion.

These devices with the tension-providing support points or the guide rails disclosed in the patent publication may provide the tension to the curtain portion without any large-volume of inflatable portions or gas supplied.

However, in the former device of the above-described patent publication, since the position of the curtain portion is limited by the cloth portion interconnecting the tension-providing support point and the curtain portion and thereby the fixed position of the curtain portion is not movable, the cloth portion becomes loose when the inflation force at the curtain reduces. As a result, there is a problem that the proper tension would not be maintained at the curtain portion.

Meanwhile, although it may be considered that the fixed position of the curtain portion is movable like the latter device of the above-described patent publication, there is a problem that when the fixed position of the curtain portion is moved, the sliding resistance would occur between the guide rail and the curtain portion, so that the prompt inflation would not be attained. Also, in the case where the guide rail is deformed at the vehicle crash, there is a concern that the proper inflation of the airbag would be provided.

SUMMARY OF THE INVENTION

The present invention has been devised in view of the above-described problems, and an object of the present invention is to provide a curtain airbag device that can maintain a proper tension of a curtain portion even if an airbag inflation force reduces and can provide a prompt inflation of the curtain portion when a fixed position is moved.

According to the present invention, there is provided a curtain airbag device, comprising a curtain portion provided at a window, the curtain portion being configured so as to be fixed to at least a window side at a portion thereof, accommodated at a peripheral portion of the window in a folded state thereof and cover the window in an inflated state thereof, and a gas supply device operative to supply gas to an inflatable portion of the curtain portion to inflate the curtain portion in a specified condition, wherein the curtain portion includes a tip side portion that is located at a tip of a side portion thereof and a tension portion that is located at the side portion thereof away from the tip side portion, the curtain portion in the folded state is accommodated in such a manner that the tip side portion is positioned near a support portion that is provided at a window edge and the tension portion is positioned near the window side to which the curtain portion is fixed, and the curtain portion is configured such that when the curtain portion is inflated with the inflation of the inflatable portion, the tip side portion is moved in an inflation direction and the tension portion is moved to the support portion so as to engage with the support portion.

Accordingly, when the curtain portion is inflated, the tension portion is moved to the support portion and thereby the tension can be generated (provided) at the curtain portion located at the support portion.

Namely, since the tension portion, which is located near the window side to which the curtain portion is fixed in the folded state, is moved to the support portion so as to engage with the support portion with the inflation of the inflatable portion, the tension can be generated by moving the support position (fixed position) of the curtain portion.

Herein, the above-described window side includes not only a straight-line window side but a curved-line window side.

Also, the support portion should not be limited to a particular structure, but it may include any types of structure as long as it can support the tension portion of the curtain portion in the inflated state, including a support pin, a support hook or a support hole.

Further, the window includes any type of window, which may be comprised of a single window pane or a plurality of window panes.

According to an embodiment of the present invention, the curtain portion is configured so as to be fixed to a first window side at a portion thereof and accommodated at the first window side, a second window side and a third window side, the second and third window sides being located at both sides of the first window side, the curtain portion includes a second-window-side tip side portion that is located at a tip of a side portion thereof located at a side of the second window side and a third-window-side tip side portion that is located at a tip of a side portion thereof located at a side of the third window side, and a second-window-side tension portion that is located at the side portion thereof at the side of the second window side away from the second-window-side tip side portion and a third-window-side tension portion that is located at the side portion thereof at the side of the third window side away from the third-window-side tip side portion, the curtain portion in the folded state is accommodated in such a manner that the second-window-side tip side portion is positioned near a second-window-side support portion that is provided at the second window side and the third-window-side tip side portion is positioned near a third-window-side support portion that is provided at the third window side, and the second-window-side tension portion and the third-window-side tension portion are positioned near the first window side, and the curtain portion is configured such that when the curtain portion is inflated with the inflation of the inflatable portion, the second-window-side and third-window-side tip side portions are moved in the inflation direction, respectively, and the second-window-side and third-window-side tension portions are moved to the second-window-side and third-window-side support portions so as to engage with the second-window-side and third-window-side support portions, respectively.

Accordingly, when the curtain portion is inflated, the second-window-side and third-window-side tension portions are moved to the second-window-side and third-window-side support portions, respectively, and thereby the tension can be generated (provided) between the second-window-side and third-window-side support portions.

Namely, since the second-window-side and third-window-side tension portions, which are located near the first window in the folded state, are moved to the respective second-window-side and third-window-side support portions so as to engage with the respective support portions with the inflation of the inflatable portion, the tension can be generated by moving the respective support positions (fixed positions) of the curtain portion.

Thus, the proper tension can be generated (provided) even at the window having a substantially tetragon shape without making the inflatable portion large or supplying a large volume of inflatable gas.

Since the support positions (fixed positions) of the curtain portion are moved, the proper tension can be maintained properly even if the inflation force of the inflatable portion reduces.

Further, since the guide rail is not used, the improper sliding resistance would not occur at the movement of the support position, the prompt inflation can be attained.

Herein, the above-described second and third window sides should not be limited to particular shape as long as they extend, being opposed to each other. Also, the shape window may include a rectangle, a parallelogram, a trapezoid, etc.

According to another embodiment of the present invention, an angle formed between the window side to which the curtain portion is fixed and an adjacent window side is configured to be obtuse.

Accordingly, when the curtain portion is inflated, the tension portion is supported at the support portion that is located outside the position of the tension portion in the folded state.

Thereby, the proper tension can be generated (provided) at the curtain portion with a relatively small inflatable portion.

According to another embodiment of the present invention, the tip side portion and the tension portion are interconnected by a band, and the band is provided so as to become away from the window side to which the curtain portion is fixed.

Accordingly, the movement of the tip side portion in the inflation direction is conveyed to the tension portion by the band interconnecting the tip side portion and the tension portion, so that the tension portion is moved to the support portion.

The linkage structure of the tip side portion to the tension portion can be attained by the simple band.

According to another embodiment of the present invention, the band is provided at an outer side of the curtain portion in the folded state.

Accordingly, the band is prevented from improperly interfering the smooth inflation of the curtain portion.

Thus, the curtain portion can be inflated more surely and promptly.

According to another embodiment of the present invention, the curtain portion has a lobe portion at which a slot is formed, and the tip side portion and the tension portion are connected by the lobe portion and the support portion engages with the slot.

Accordingly, the movement of the tip side portion in the inflation direction is conveyed to the tension portion by the lobe portion interconnecting the tip side portion and the tension portion, so that the tension portion is moved to the support portion.

Thereby, the linkage structure of the tip side portion to the tension portion can be attained without any additional member, so the productivity and the low costs can be improved.

According to another embodiment of the present invention, the window is a vehicle window, and the specified condition includes at least a vehicle-crash detection, a vehicle-crash prediction, or a vehicle-rollover detection.

Thus, the present invention can be applied to a vehicle airbag device that is inflated at the vehicle crash and the like.

Accordingly, the occupant protection by the vehicle curtain airbag device, in which the prompt inflation is required, can be improved.

According to another embodiment of the present invention, the support portion forms a tension line at the curtain portion when the curtain portion is inflated, and the tension line is formed at a location in which a center of an occupant's head is located at a side of the window side to which the curtain portion is fixed relative to the tension line.

Accordingly, the tension is generated at the portion of the curtain portion that is located at the side of the inflation direction from the occupant's head center.

Thereby, the occupant's head can be protected surely by the curtain portion, and thereby the occupant's head can be properly prevented from moving outside the vehicle at the vehicle rollover, vehicle crash or the like.

According to another embodiment of the present invention, the inflatable portion is formed near the tension portion.

Accordingly, the movement of the inflatable portion away from the window side at the inflation can be conveyed to the tension portion promptly and surely.

Thereby, the movement of the tension portion is made so quick that the inflation of the curtain portion can be attained promptly.

According to another embodiment of the present invention, the inflatable portion is formed on the tension line of the curtain portion that is formed by the support portion.

Accordingly, since the inflatable portion is inflated on the tension line, an apparent length of the tension line is made short.

Thereby, the proper tension can be provided at the tension line, so the effect of the curtain airbag device of the present invention can be improved.

According to another embodiment of the present invention, the inflatable portion has a tip portion, and when the curtain portion is inflated, the tip portion of the inflatable portion extends beyond a window side other than the window side to which the curtain portion is fixed.

Accordingly, when the curtain portion is inflated, the tip portion of the inflatable portion extends and comes to engage with another window side. As a result, the tension can be generated (provided) at a portion of the curtain portion that is located at the inflation-direction side from the support portion.

Herein, although how much distance the tip portion of the inflatable portion extends beyond another window side should not be limited, it would be preferable that the distance from an edge of another window side to a tip end of the tip portion that has extended is about 5-30 cm.

According to another embodiment of the present invention, the inflatable portion has the tip portion, and when the curtain portion is inflated, the tip portion of the inflatable portion extends beyond a window side other than the first, second and third window sides.

In this case, the same effect described above can be obtained.

According to another embodiment of the present invention, the inflatable portion is configured so as to be inflated in a substantially pole shape, extending beyond the window side.

Accordingly, the gas supply to the tip portion of the inflatable portion can be done quickly, and the inflatable portion in the substantially pole shape extends to the window side.

Thereby, since the prompt inflation of the curtain portion can be attained and the inflated portion in the pole shape can be formed so as to cross over the window, the proper tension can be provided at the curtain portion surely.

According to another embodiment of the present invention, the inflatable portion is inflated in the substantially pole shape so as to be located close to either one of the second and third window sides.

Accordingly, the tension portion at the second window side or the third window side can be moved more quickly to the support portion.

Thereby, the tension portion can be made engage with the support portion quickly, so the tension can be promptly provided at the curtain portion.

According to another embodiment of the present invention, the window is a side window provided at a vehicle side, the specified condition includes at least a vehicle-crash detection, a vehicle-crash prediction, or a vehicle-rollover detection, and the inflatable portion is configured so as to be inflated, extending from the first window side located at an upper side of the vehicle beyond a belt line of a lower window side of the side window, in such a manner that the inflatable portion in the inflated state overlaps with a vertically-extending window pillar of the vehicle.

Accordingly, in the curtain airbag device to cover the relatively-large side window of the vehicle, the proper tension can be provided at the curtain portion in a large range in the vehicle longitudinal direction, tanking advantage of the vehicle hard pillar.

Thus, the occupant's head can be surely protected by the curtain portion, so the occupant's head can be properly prevented from moving outside the vehicle.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
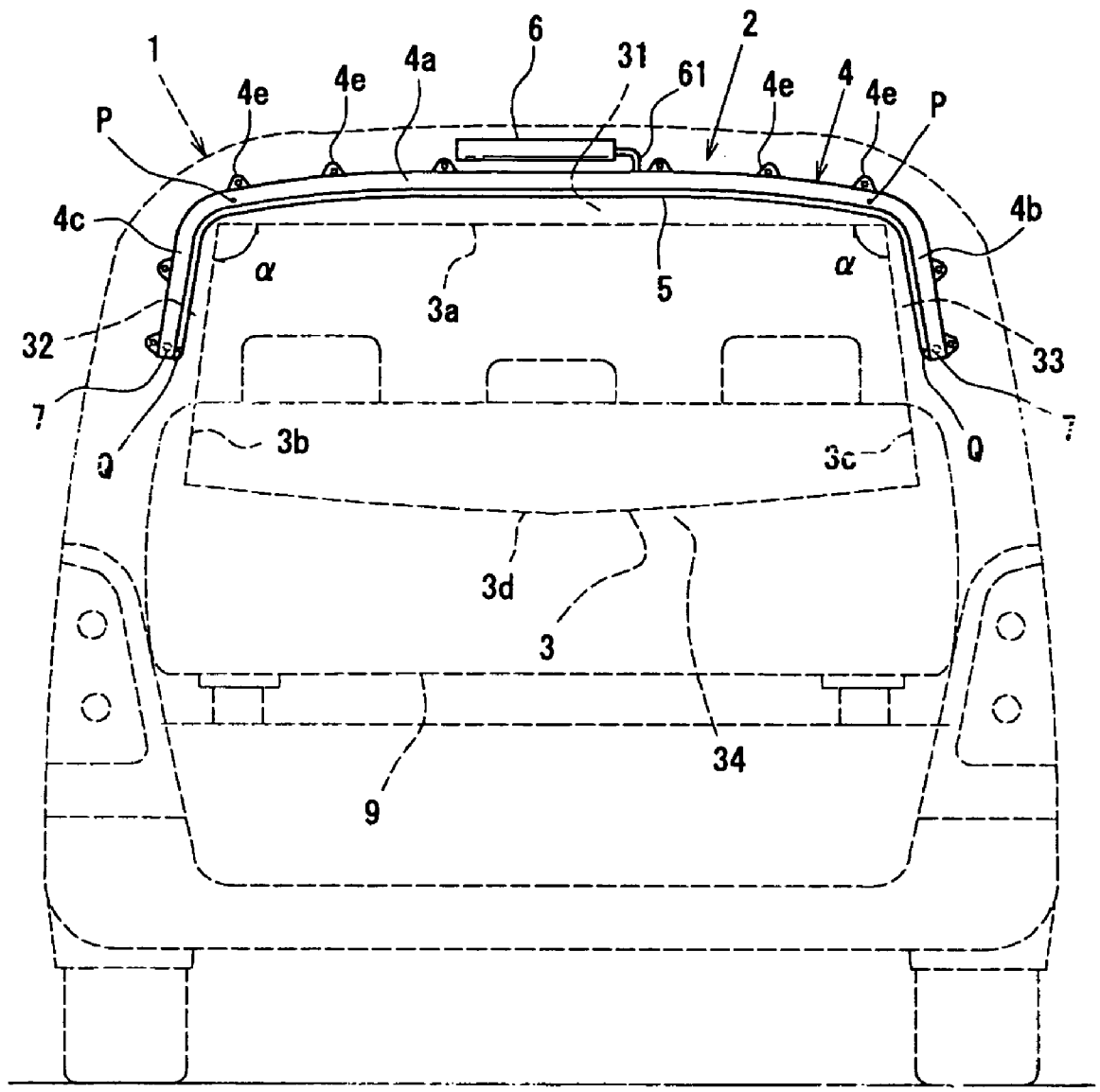
FIG. 1 is a back view of a vehicle showing a vehicle equipped with a curtain airbag device in a folded state according to the present invention.
Figure 2:
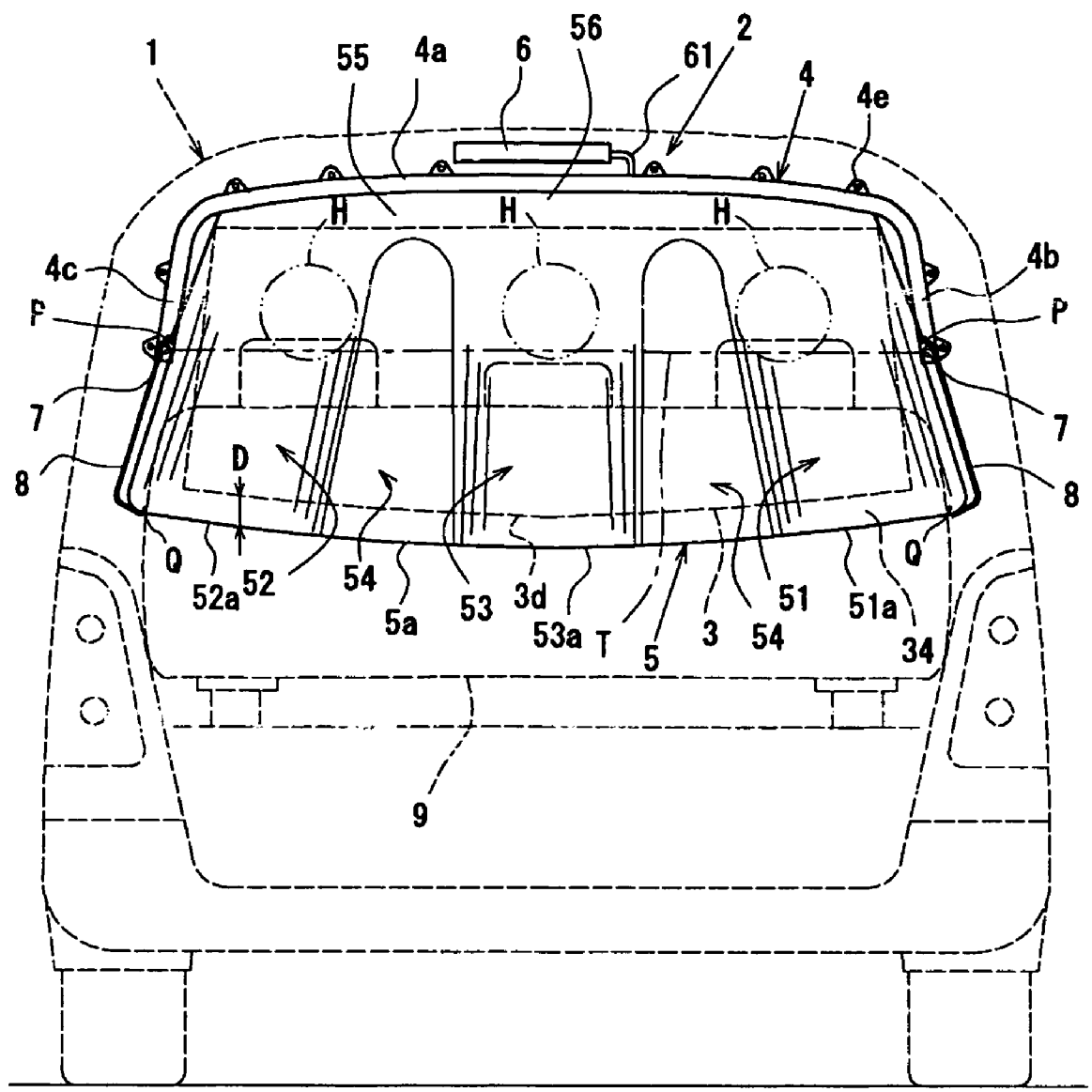
FIG. 2 is a back view of the vehicle showing the curtain airbag device in an inflated state.
Figure 3A:
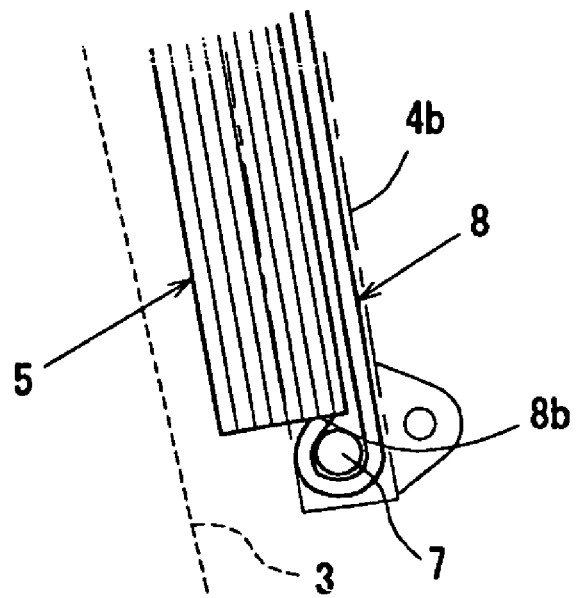
FIG. 3A is a detailed view of a major portion of a support pin in the folded state.
Figure 3B:
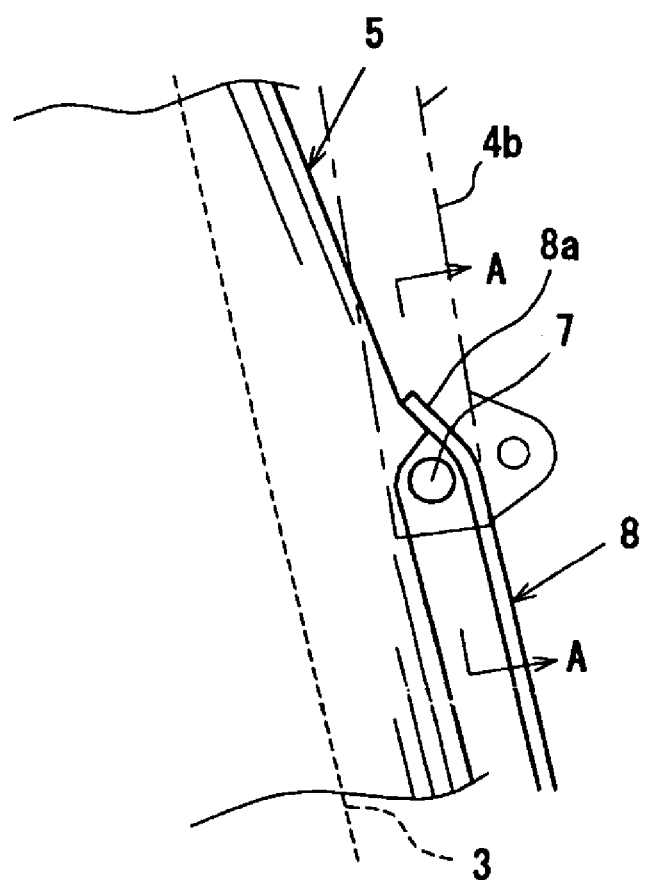
FIG. 3B is a detailed view of the major portion of the support pin in the inflated state.
Figure 4:
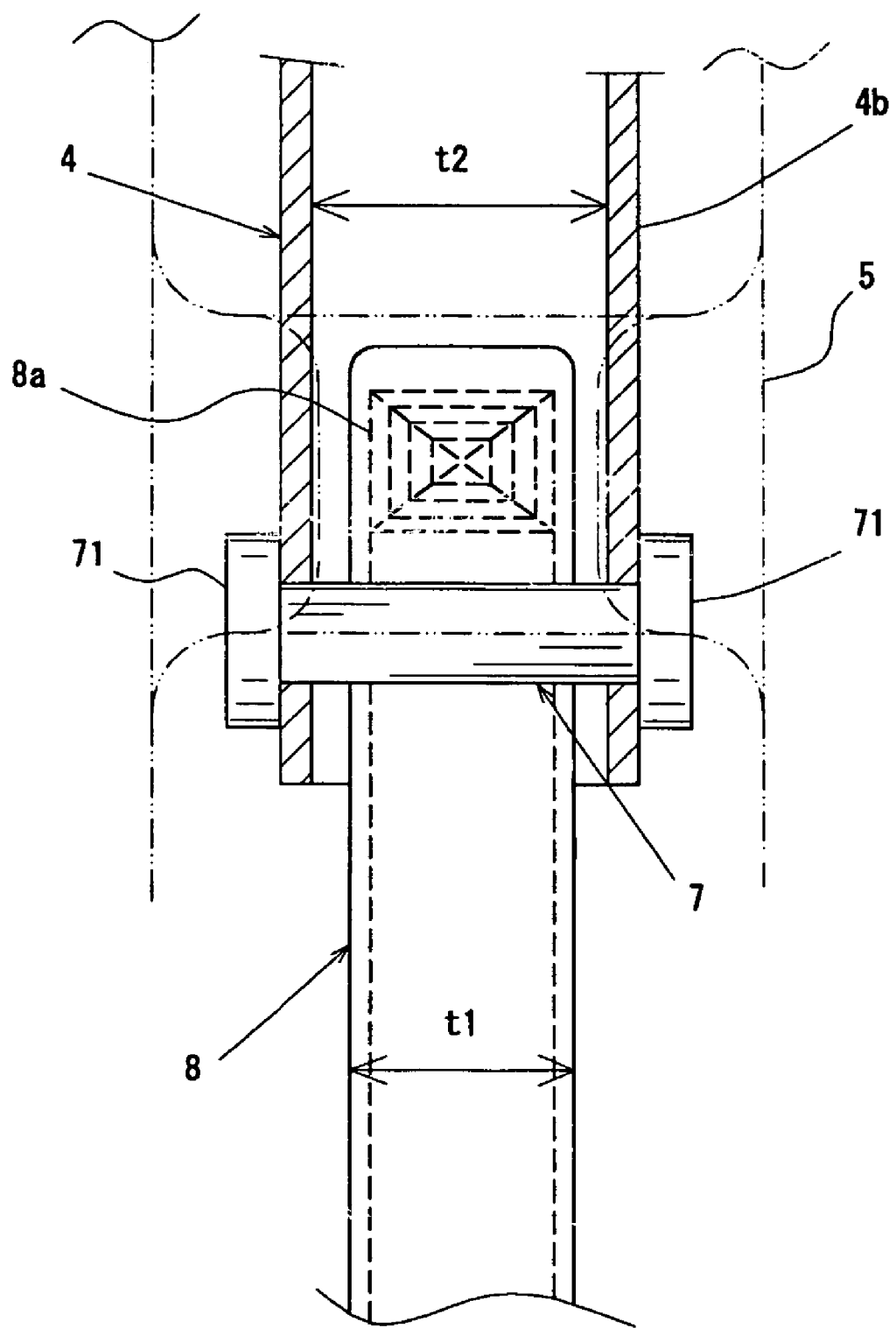
FIG. 4 is a sectional view taken along line A-A of FIG. 3B.
Figure 5:
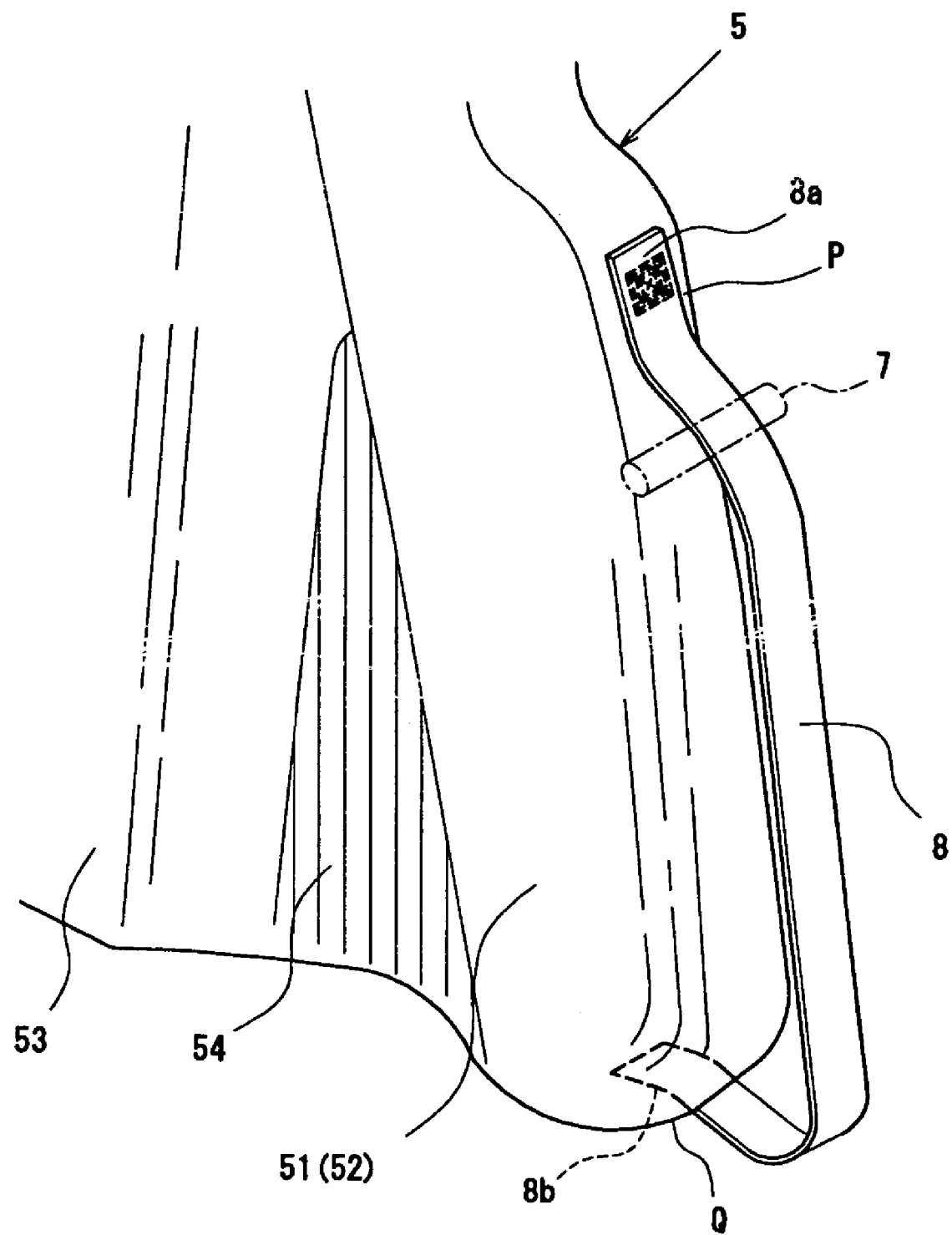
FIG. 5 is a perspective view showing a major side portion of a curtain portion.

An embodiment 1 of the curtain airbag device of the present invention will be described referring to FIGS. 1-5. The embodiment 1 shows a curtain airbag device 2 that is provided at a back door 1 of the vehicle. FIG. 1 is a back view of the vehicle showing the curtain airbag device 2 in a folded state. FIG. 2 is a back view of the vehicle showing the curtain airbag device 2 in an inflated state. FIG. 3A is a detailed view of a major portion of a support pin of the curtain airbag device 2 in the folded state. FIG. 3B is a detailed view of the major portion of the support pin of the curtain airbag device 2 in the inflated state. FIG. 4 is a sectional view taken along line A-A of FIG. 3A. FIG. 5 is a perspective view showing a major side portion of a curtain portion.

The curtain airbag device 2, as shown in FIGS. 1 and 2, is placed at the peripheral portion of a back window 3 of the back door 1. The curtain airbag device 2 comprises a base casing 4 that is located along three sides, an upper edge 31 and both side edges 32, 33, of the trapezoid-shaped back window 3, a cloth-made curtain portion 5 that is accommodated in the folded state within the base casing 4, an inflator 6 that is fixed to the back door 1 above the base casing 4 and supplies inflatable gas to the curtain portion 5 at the vehicle crash and the like, an airbag sensor (not illustrated) that detects a crash impact and the like, and a control unit (not illustrated) that determines the vehicle crash, the vehicle rollover or high possibility of those based on signals of the airbag sensor and generates the gas supply signal based on the determination.

Herein, the airbag sensor of the present embodiment is provided at near a rear bumper to detect the vehicle rear crash and inflate the curtain portion 5 to protect the occupant at the vehicle rear crash.

The base casing 4, which is comprised of a metal frame member with a U-shaped cross section which opens toward the inside of the back window 3, includes an upper-edge side portion 4a that is located at an upper edge 31 of the back window 3, and a right-edge side portion 4b and a left-edge side portion 4c that are located at both-side edges 32, 33.

Also, at lower ends of the both side portions 4b, 4c are provided support pins 7, 7 to support the curtain portion 5 when the airbag is inflated. These pins 7, 7 are located with their axes extending in a vehicle longitudinal direction.

The side portions 4a, 4b, 4c have respective attaching flanges 4e . . . at outer portions to attach firmly the base casing 4 to an inner panel (not illustrated) of the back door 1. Thereby, the base casing 4 can support surely a reaction force of the inflation of the curtain portion 5 and a reaction force of the tension applied to the curtain portion 5.

The curtain portion 5 is made of cloth, and accommodated in the folded state within the base casing 4. Then, it is inflated in a substantially trapezoid shape so as to cover a whole area of the trapezoid-shaped back window 3 as shown in FIG. 2.

The curtain portion 5 has inflatable portions 51, 52, 53 at its both sides and center respectively which extend vertically. Between theses inflatable portions are formed non-inflatable portions 54. Also, at the upper end of these inflatable portions 51, 52, 53 is formed a connecting inflatable portion 55, through which the gas is properly distributed into the respective portions 51, 52, 53.

The curtain portion 5 is formed such that its lower end 5a can extend to a portion below the lower-end side 3d of the back window 3 when it is inflated. Specifically, the lower end 5a extends to the portion approximately 5-30 cm (D) below the lower-end side 3d of the back window 3. Thereby, respective lower-end portions 51a, 52a, 53a of the inflatable portions 51, 52, 53 can be also located below the lower-end side 3d of the back window 3.

Further, the inflatable portions 51, 52, 53 are formed so as to be inflated in a column shape in such a manner that three column-shaped inflated portions stand side by side, extending vertically, in its fully inflated state as shown in FIG. 2.

Accordingly, the lower-end portions 51a, 52a, 53a of the inflatable portions 51, 52, 53 engage with the lower edge 34 of the back window 3, so that the inflatable portions 51, 52, 53 can have the tension in the vertical direction, i.e., in the airbag inflation direction.

Also, the inflatable portions 51, 52 located at the both sides are formed near tension portions P, P, which are described below, so as to promptly move the tension portions P, P to the position of the support pins 7, 7.

The curtain portion 5 is fixed to the upper-edge side portion 4a of the base casing 4 only via its upper portion (base portion) 56. But, both sides of the curtain portion 5 are not fixed to the right-edge side portion 4b and the left-edge side portion 4c. Thereby, the curtain portion 5 can be inflated freely away from the both sides without being restricted by these both side portions 4b, 4c of the case casing 4 (except the support pins 7, 7) when inflated.

Further, to the both sides of the curtain portion 5 are attached cloth-made bands 8, 8 extending vertically by stitching.

Specifically, as shown in FIG. 5, the band 8 is formed of cloth that has the same rigidity as the curtain portion 5 or harder rigidity than the curtain portion 5, and its upper end 8a and lower end 8b are firmly fixed by stitching to respective portions near the tension portion P located in the side-middle position and an end portion Q located in the side-lower position.

The length of each band 8 may be determined based on the length of the inflatable portion 51 (52) of the curtain portion 5 that is inflated extending downward, which is set to be enough long such that the upper end 8a of the band 8 comes to engage with the above-described support pin 7 when the inflation of the curtain portion 5 is completed.

The above-described inflator 6 is disposed at the upper end portion of the back door 1 so as to extend in the vehicle width direction, and supplies the gas to the inflatable portions 51, 52 of the curtain portion 5 when receiving the gas supply signal from the control unit. Herein, in order to maintain the tension of the curtain portion 5 for a properly long period, it is preferable that this gas is comprised of so-called low-temperature gas whose expansion rate does not change. High-temperature gas that can be generated by igniting the conventional solid material may be also applied.

A supply pipe 61 to supply the gas into the inflatable portions 51, 52, 53 is connected to the inflator 6.

Herein, the above-described airbag sensor and the control unit are generally well known, so the descriptions of those are omitted here.

Next, the support pin 7 and the band 8 of the curtain airbag device 2 according to the present embodiment will be described in detail.

FIGS. 3A, 3B illustrate relationships between the support pin 7 and the band 8 in the folded state and the inflated state of the curtain portion 5, respectively.

When the curtain portion 5 is in the folded state as shown in FIG. 3A, the belt 8 is located outside the curtain portion 5 (hereinafter, the side of the back window 3 is referred to as the inside), and within the base casing 4, surrounding the support pin 7 with its lower portion. Meanwhile, when the curtain portion 5 is in the inflated state as shown in FIG. 3B, the band 8 is moved downward along with the curtain portion 5, so that the band 8 comes to engage with the support pin 7 at the side of the upper end 8a.

As described above, the band 8 is configured so as to engage with the support pin 7 in different positions in the folded state and the inflated state.

This is because the tip portion Q of the curtain portion 5 is moved downward due to the inflation force of the inflatable portion 51 (52) and thereby the band 8 is pulled down.

The band 8 is formed at the side portion of the curtain portion 5 which is opposite to the inflation direction of the curtain portion 5, so substantially no slide resistance would occur between the support pin 7 and the band 8 when they move relatively (when the curtain airbag is inflated). Thus, positions of these support pin 7 and band 8 would not be restricted by each other during the airbag inflation, and the band 8 comes to engage with the support pin 7 only when the airbag inflation is completed.

As shown in FIG. 4, the width t1 of the band 8 is set to be shorter than the width t2 of the base casing 4, so that the band 8 can easily get out of the base casing 4. Herein, the curtain portion 5 is accommodated within the base casing 4 with the width t2.

The support pin 7 is made of a metal pole-shaped member, and its both ends are supported at the base casing 4 as illustrated so as to have a sufficient support rigidity. Also, boss portions 71, 71 having a large diameter are formed respectively at both ends of the support pin 7, so that the support pin 7 can be prevented from dropping off.

Herein, instead of the support pin 7, a bolt and a nut may be provided and the band 8 may be supported by the a shaft portion of the bolt.

Figure 6A:
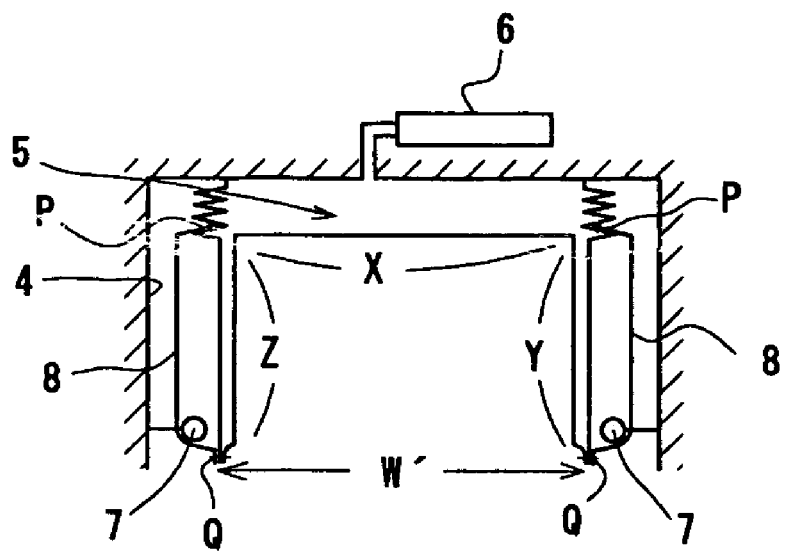
FIG. 6A is a schematic diagram showing operation of an embodiment 1 in the folded state.
Figure 6B:
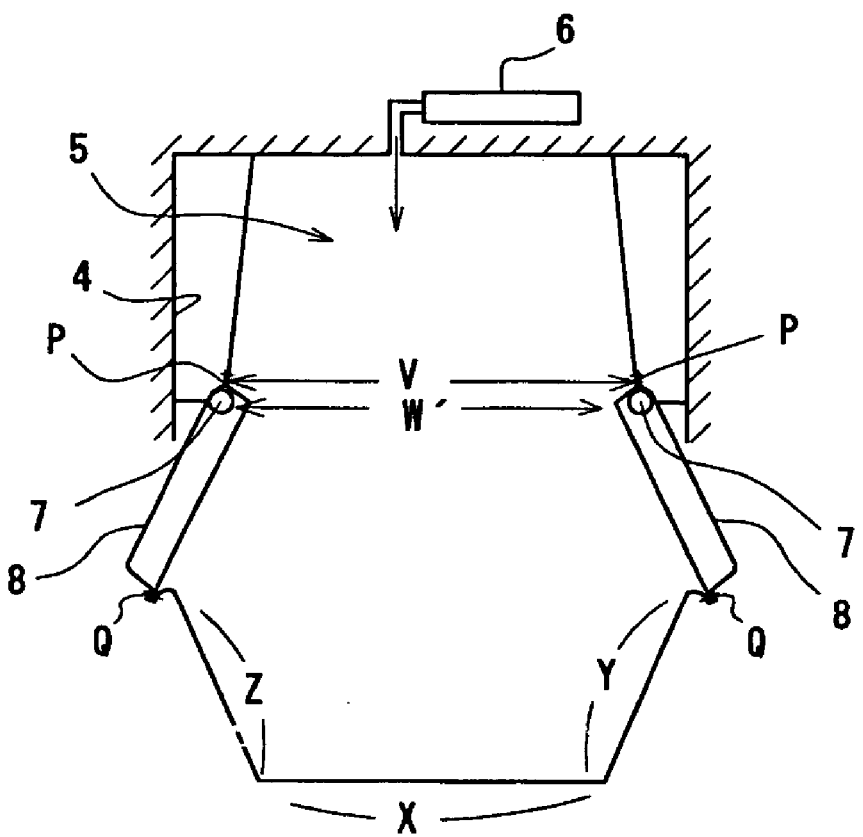
FIG. 6B is a schematic diagram showing operation of the embodiment 1 in the inflated state.
Figure 7A:
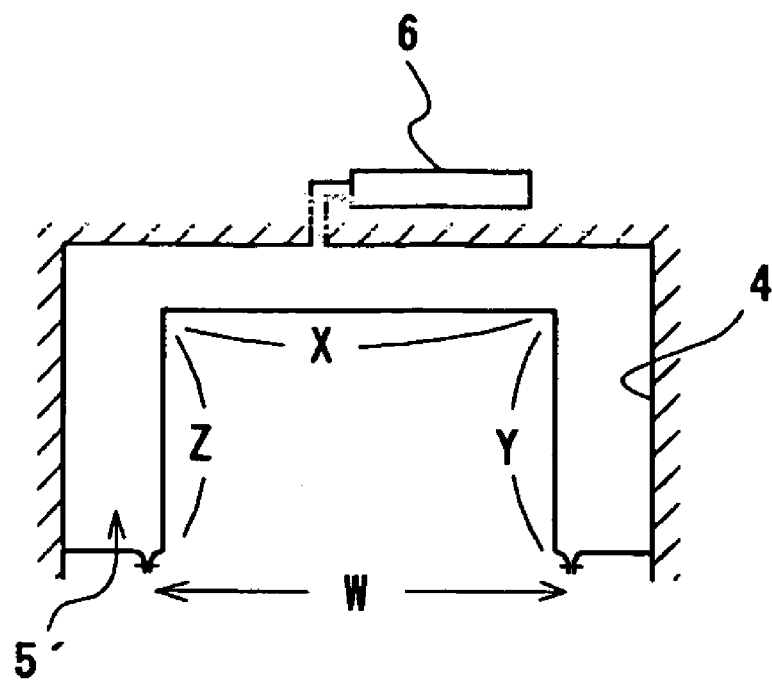
FIG. 7A is a schematic diagram showing operation of a conventional device in the folded state.
Figure 7B:
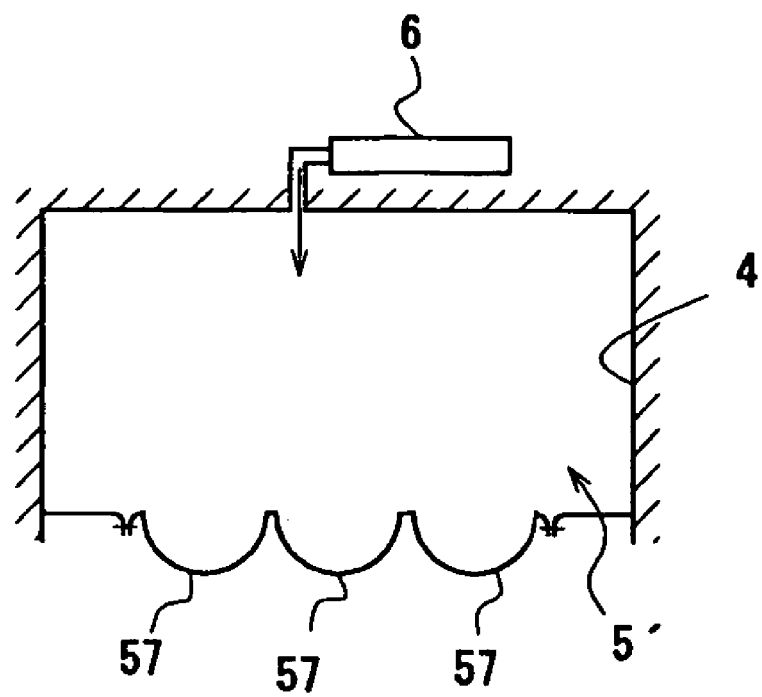
FIG. 7B is a schematic diagram showing operation of the conventional device in the inflated state.

Hereinafter, operation of the curtain airbag device 2 of the present embodiment described above will be described referring to FIGS. 6A, 6B and 7A, 7B. FIGS. 6A, 6B are schematic diagrams showing operation of the present embodiment, and FIGS. 7A, 7B are schematic diagrams showing operation of a conventional device. Herein, the same components at those described above are denoted by the same reference characters, and their description are omitted here.

In the conventional device, the curtain portion 5' would require a long free end as shown in FIG. 7A. Because the curtain portion 5' having three sides with the upper-edge side length X, the right-edge side length Y and the left-edge side length Z need to be accommodated fully within the casing 4. Therefore, the conventional device has a plurality of large inflatable portions 57 (pole-shaped portions) so that the total length of the three sides (X+Y+Z) can be absorbed by the length of the remaining side (X) as shown in FIG. 7B.

However, forming the large inflatable portions 57 would require a large space for the inflation of these portions 57 that needs to be reserved in the vehicle cabin. Also, a large volume of gas to be supplied would be necessary.

Meanwhile, according to the present embodiment, the support position (fixed position) of the both sides of the curtain portion 5 is configured so as to be movable by the above-described support pins 7, 7 and the bands 8, 8 even if the curtain portion 5 has the three sides with the upper-edge side length X, the right-edge side length Y and the left-edge side length Z as shown in FIG. 6A. Accordingly, when the airbag portion 5 is inflated, the tip portions Q, Q of the curtain portion 5 are moved downward and thereby the tension portions P, P connected by the bands 8, 8 are pulled down to the position of the support pins 7, 7 as shown in FIG. 6B.

Thus, the tension can be provided to the curtain portion 5 at W' between the support pins 7, 7 with the length V between the right-side tension portion P and the left-side tension portion P, which is shorter than the three-side length (X+Y+Z).

Accordingly, it is not necessary to form the large inflatable portion and to supply the large volume of inflatable gas.

Namely, according to the curtain airbag device 2 to cover the large back window 3 of the present embodiment, the curtain portion 5 can be inflated properly without the large inflatable portion and the large volume of inflatable gas.

Further, since the present embodiment forms the movable structure of the support position of the side portion of the curtain portion 5 with the bands 8, 8 and the support pins 7, 7, the support position (fixed position) of the curtain portion 5 can be changed with the simple structure and the prompt inflation can be attained without any improper occurrence of slide resistance that would be caused by guide rails adopted.

Also, according to the present embodiment, the curtain portion 5 in the inflated state is formed such that the lower end 5a extends to the portion below the lower-end side 3d of the back window 3 and the lower-end portions 51a, 52a, 53a of the inflatable portions 51, 52, 53 engage with the lower edge 34 of the back window 3. Thereby, the lower portion (front-end portion) of the curtain portion 5 that is located below the tension portions P, P can have the tension.

Thus, the curtain portion 5 can have the properly-increased tension at the entire area, thereby improving the occupant protection.

In particular, since the inflatable portions 51, 52, 53 are inflated in the pole shape, the gas supply to the lower end portions 51a, 52a, 53a of the inflatable portions 51, 52, 53 can be attained and the inflatable portions 51, 52, 53 in the inflated state can extend to the lower edge 34 of the back window 3.

Thereby, the prompt inflation of the curtain portion 5 can be provided and the tension of the curtain portion 5 can be increased surely over its vertical direction.

The back window 3 of the present embodiment has the trapezoid shape with the longer bottom side as shown in FIG. 1, and the angle α formed between an upper-edge side 3a and both side-edge sides 3b, 3c is configured to be obtuse, about 95 degrees. Accordingly, the base casing 4 has likewise the trapezoid shape having a longer lower-open end, and the support pins 7, 7 are located at portions accordingly. Thus, the distance between the tension portions P, P is longer than the upper-edge side 3a, which may provide the tension to the curtain portion 5 easily.

Further, since the bands 8, 8 of the present embodiment are provided at the outer side of the curtain portion 5 and located within the base casing 4, the curtain portion 5 can get out of the base casing 4 smoothly and thereby be surely inflated, without any interference with the bands 8, 8.

Also, since the band 8 is configured so as to slide in a gap between the support pin 7 and the base casing 4, the band 8 can be pulled out in a specified direction. Thereby, the stable inflation of the curtain portion 5 can be attained.

In addition, the support pin 7 of the present embodiment is located below the center of a head H of the occupant seated in the seat as shown in FIG. 2, so that a tension line T that will be formed between the support pins 7, 7 at the airbag inflation is positioned at a level that is below the center the occupant's head H. Thereby, the occupant's head H can be prevented from moving outside the vehicle at the vehicle crash or the like, so the safety of the occupant can be improved.

Further, since the both-side inflatable portions 51, 52 of the present embodiment are provided at the side portion of the curtain portion 5 which is near the tension portions P, P, the inflation force of the inflatable portions 51, 52 can be quickly transferred to the tension portions P, P. Thereby, the movement of the tension portions P, P in the inflation direction (downward) is promoted, so the tension portions P, P can be moved to the support pins 7, 7 promptly and the curtain portion 5 can be inflated surely.

Since the curtain portion 5 has the three inflatable portions 51, 52, 53 at the both sides and the center, the three occupants' heads H can be properly protected by these portions 51, 52, 53 by absorbing the crash impact.

Also, since the inflatable portions 51, 52, 53 extend vertically beyond the above-described tension line T, an apparent length of the tension line T is made short at the inflation of the inflatable portions 51, 52, 53 and the tension can be provided surely, thereby further increasing the tension at the tension line T.

Figure 8A:
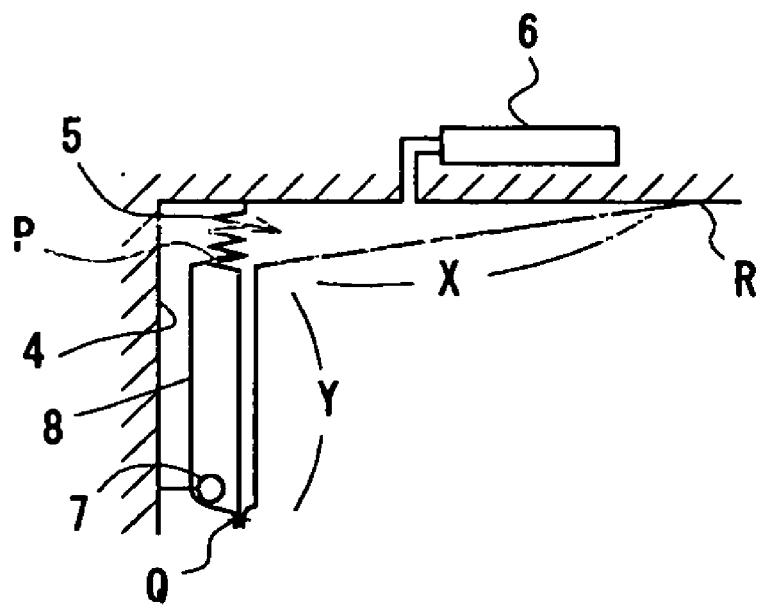
FIG. 8A is a schematic diagram of operation in which the support pin and a band are provided only at one side in the folded state.
Figure 8B:
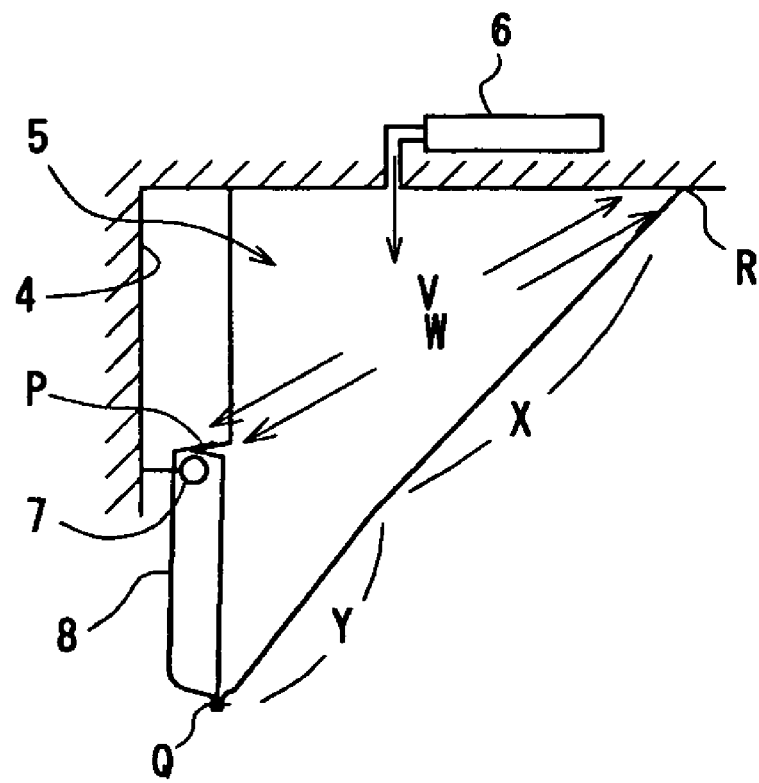
FIG. 8B is a schematic diagram of operation in which the support pin and the band are provided only at one side in the inflated state.

FIGS. 8A, 8B are schematic diagrams of operation in which the support pin 7 and the band 8 are provided only at one side (at the left in figure). Accordingly, a substantially triangular window is covered.

Herein, since the support position (fixed position) of the one side of the curtain portion 5 is likewise configured so as to be movable by the support pin 7 and the band 8 even if the curtain portion 5 has the two sides with the length (X+Y) as shown in FIG. 8A, when the airbag portion 5 is inflated, the tip portion Q of the curtain portion 5 is moved downward and thereby the tension portion P connected by the band 8 is pulled down to the position of the support pin 7 as shown in FIG. 8B.

Thus, the tension can be provided to the curtain portion 5 at W between the support pin 7 and another end R, with the length V between the tension portion P and the another end R, which is shorter than the two side length (X+Y).

Accordingly, in the case where the triangular window is covered, the curtain portion 5 can be likewise inflated properly without the large inflatable portion and the large volume of inflatable gas.

Embodiment 2

Figure 9:
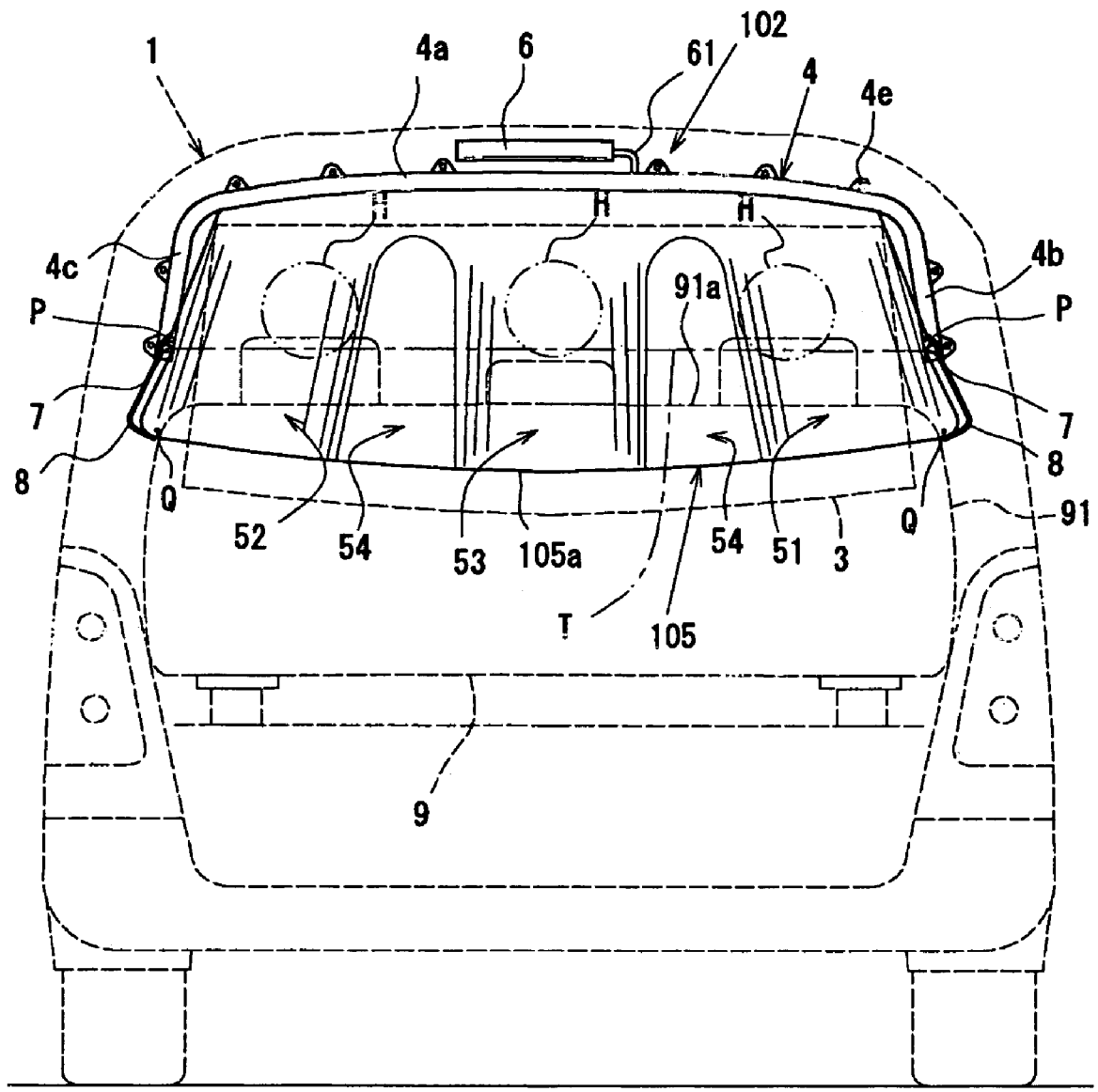
FIG. 9 is a back view of a vehicle showing an embodiment 2.

Next, the curtain airbag device according to another embodiment 2 will be described referring to FIG. 9. A curtain airbag device 102 is provided at the back door 1 as well as the device of the embodiment 1. Herein, the same components are denoted by the same characteristics as those described above, and descriptions of those are omitted here.

The curtain airbag device 102 of the present embodiment is configured such that although the vertical length of a curtain portion 105 is set to be short compared with the embodiment 1, the proper tension can be provided at the tension line T as well.

Namely, the curtain portion 105 is formed such that it does not cover the entire area of the back window 3 but its lower end 105*a* extends to a portion just below an upper end 91*a* of a seat back 91 of a rear seat 9 when it is inflated.

Thereby, the curtain portion 105 itself is made small, so the proper tension can be also provided even with a smaller gas volume.

Also, since this curtain portion 105 covers the area above the seat back 91, the occupant's movement toward the outside of the vehicle can be properly prevented by the curtain portion 105 as well.

Accordingly, the curtain airbag device 102 of the present embodiment can also maintain the safety of the occupant without deteriorating the occupant protection.

Other functions are the same as those of the previous embodiment 1.

Embodiment 3

Next, the curtain airbag device according to another embodiment 3 will be described referring to FIG. 10. A curtain airbag device 202 is provided at the back door 1 as well as the device of the embodiments 1 and 2. Herein, the same components are denoted by the same characteristics as those described above, and descriptions of those are omitted here.

A curtain portion 205 of the curtain airbag device 202 has a lower inflatable portion 257 that extends in the vehicle width direction. Herein, the lower inflatable portion 257 is formed such that its both ends are hocked by both-side edges 32, 33 of the back window 3 when the airbag is inflated. Thereby, the tension can be further generated at the lower portion below the tension line T between the support pins 7, 7.

Accordingly, even when there occurs some force operative to move the lower portion of the curtain portion 205 below the support pins 7, 7 towards the outside the vehicle, the curtain portion 205 can be surely kept located inside the vehicle cabin.

Thus, the occupant protection can be improved by further generating the tension at the lower portion of the curtain portion 5.

Other functions are the same as those of the previous embodiment 1.

Embodiment 4

Figure 11:
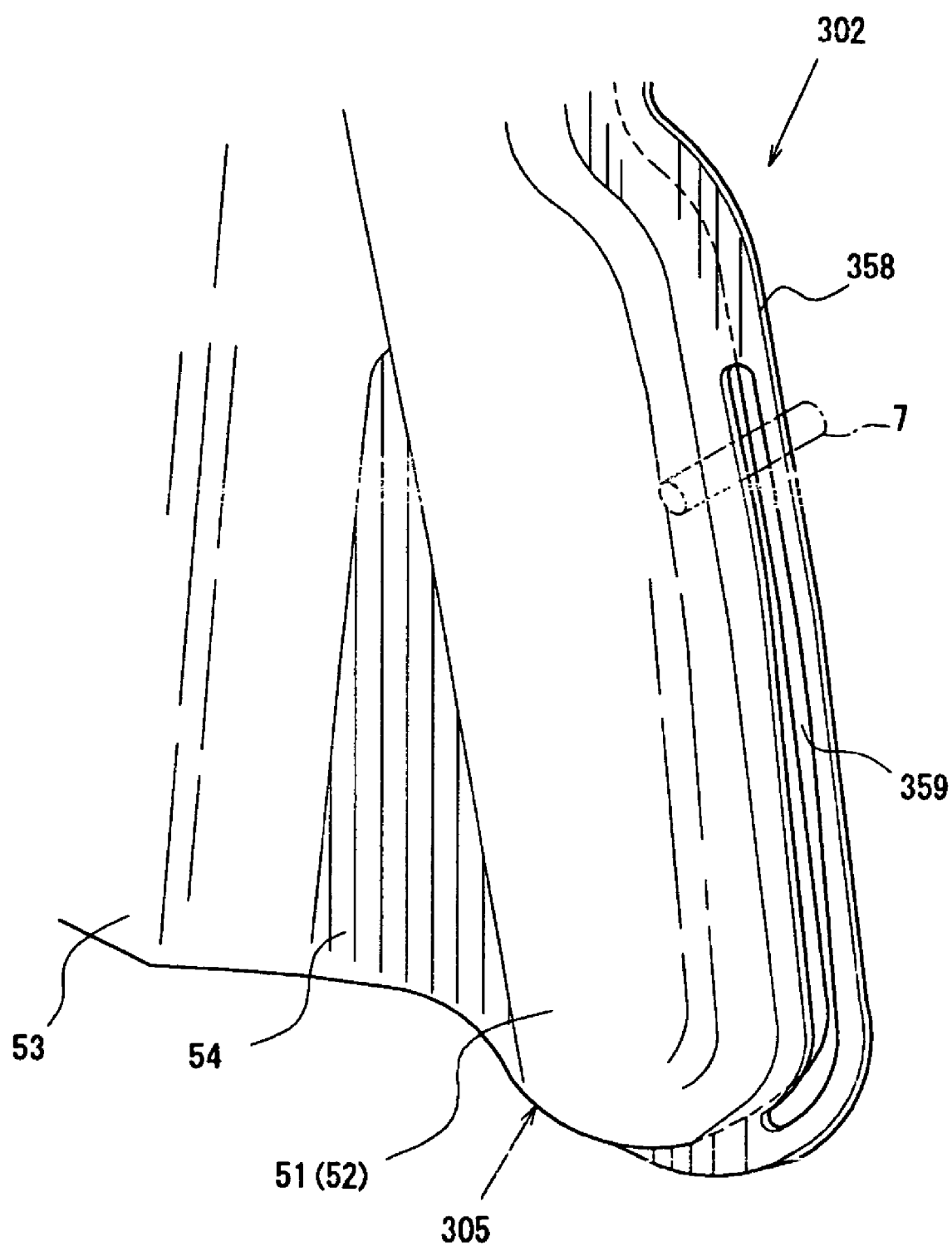
FIG. 11 is a perspective view of a major portion showing a side portion of a curtain portion according to an embodiment 4.

Next, the curtain airbag device according to a nother embodiment 4 will be described referring to FIG. 11. In the present embodiment 4, another structure to move the support position (fixed position) of the side portion of the curtain airbag is adopted. FIG. 11 corresponds to FIG. 5.

A curtain portion 305 of a curtain airbag device 302 of the present embodiment has a lobe portion 358 at the side instead of the band. The lobe portion 358 has a specified width and extends vertically. A slot 359 (guide hole) is formed at the lobe portion 358.

Herein, the support pin 7 is configured so as to engage with the slot 359 in such a manner that the engagement position of the support pin 7 changes vertically between the folded state and the inflated state of the curtain portion 305. Thereby, the tension can be provided between the both-side support pins 7, 7, like the previous embodiments.

Likewise, the present embodiment can also provide the device having the properly small inflatable airbag portions and inflatable gas volume.

Particularly, since the simple lobe portion 358 is used, any additional separate member like the band 8 would not be necessary, thereby improving the productivity and costs reduction.

Embodiment 5

Next, the curtain airbag device according to another embodiment 5 will be described referring to FIG. 12. A curtain airbag device 402 of the present embodiment is provided at a side door 410 located at the side of the vehicle.

The vehicle equipped with the curtain airbag device 402 includes a front seat S1, a first rear seat S2 and a second rear seat S3 in its cabin, and front windows 411, rear windows 412 and quarter windows 413 at its both sides. There are also provided A pillars 421, B pillars 422, C pillars 423 and D pillars 424, and a roof side panel 425 is disposed above these windows 411, 412, 413.

A base casing 404 of the curtain airbag device 402 is disposed at the A pillar 421, roof side panel 425 and D pillar 424 so as to enclose the windows 411, 412, 413.

A curtain portion 405 is likewise accommodated within the base casing 404 in the folded state like the embodiment 1. The curtain portion 405 is operative to be inflated by gas from an inflator 406 disposed at the D pillar 424.

Figure 12:
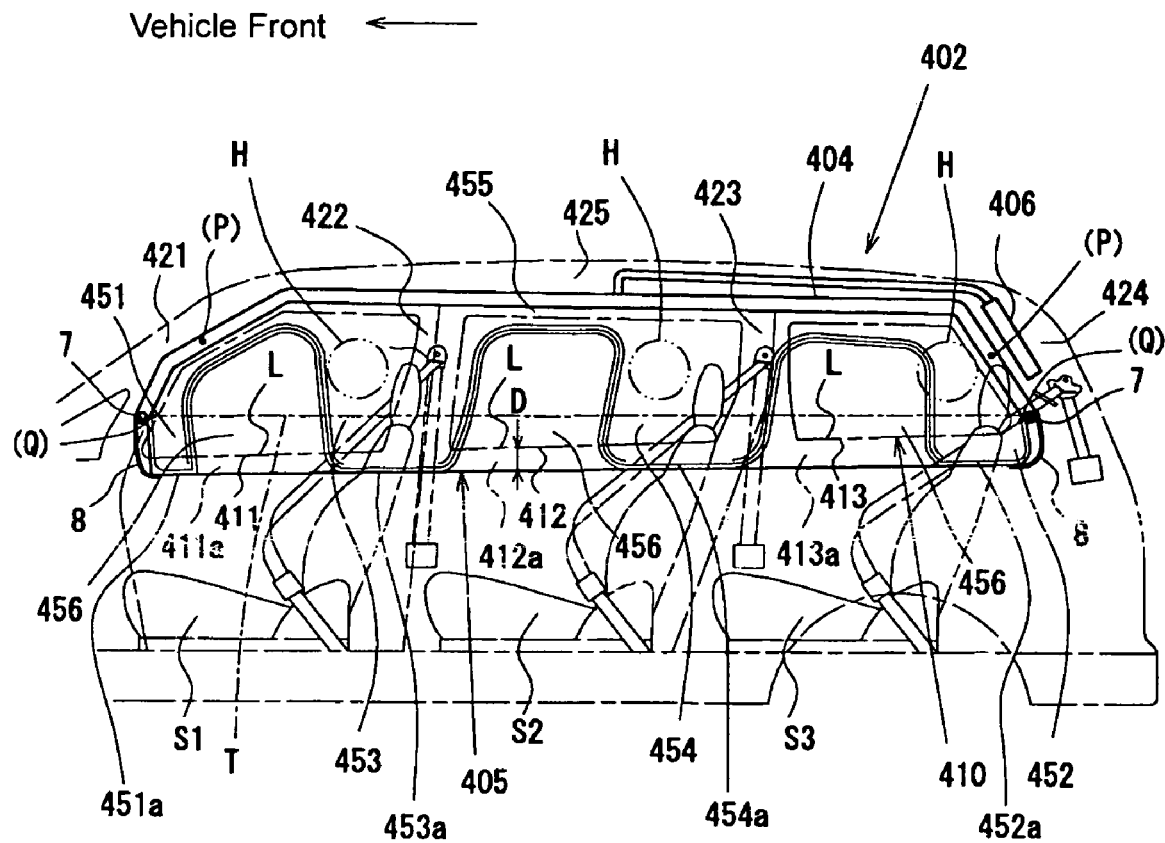
FIG. 12 is a side view of a vehicle showing an embodiment 5.

Herein, FIG. 12 shows the curtain portion 405 in the inflated state.

The curtain portion 405 has the bands 8, 8 at the both sides (the front side and the rear side), which engage with the support pins 7, 7 provided at side lower end portions of the base casing 404, like the embodiment 1.

The bands 8, 8 are connected respectively to the tension portion P, P at the middle portion of the curtain portion 405 at their upper ends and to the tip portions Q, Q located near the support pins 7, 7 at their lower ends ((P), (Q) show their positions in the folded state in the drawings).

When the airbag is inflated, the tip portions Q, Q are pulled down by the bands 8, 8 to the lower positions, where the tension portion P, P come to engage with the support pins 7, 7.

Accordingly, in the event that the airbag sensor (not illustrated) provided at the vehicle pillars (B pillar 422, C pillar 423) detect the side-crash impact, or the airbag sensor (not illustrated) comprised of a roll-angle sensor detects (predicts) the vehicle rollover, the control unit (not illustrated) operate so as to inflate the curtain portion 405.

Thereby, the tension line T to generate the tension between support pins 7, 7 is formed like the embodiment 1.

In particular, since the plural windows 411, 412, 413 are covered by the single curtain portion 405 in the present embodiment, the generation of the tension can be obtained easily by moving the tension portion P, P to the position of the support pins 7, 7.

The curtain portion 405 comprises side inflatable portions 451, 452 to inflate the side lower end thereof, central inflatable portions 453, 454 to inflate at the occupant's head, and a connecting inflatable portion 455 to interconnect these inflatable portions at above. And, between these inflatable portions are formed non-inflatable portions 456.

The curtain portion 405, like the embodiment 1, extends downward beyond the belt line L, lower ends of the windows 411, 412 and 413. Specifically, it extends to the portion approximately 5-30 cm (D) below the belt line L. Thereby, respective lower-end portions 451a, 452a, 453a, 454a of the inflatable portions 451, 452, 453, 454 are located below the belt line L.

Accordingly, the lower-end portions 451a, 452a, 453a, 454a of the inflatable portions 451, 452, 453, 454 engage with the lower edge of the windows 411, 412 and 413 in the inflated state, so the inflatable portions 451, 452, 453, 454 can have the intension in the vertical direction, i.e., in the inflation direction.

Also, since the side inflatable portion 451, 452 are formed at the location near the tension portions P, P, the tension portions P, P can be quickly moved to the support pins 7, 7 when those are inflated like the embodiment 1.

Figure 10:
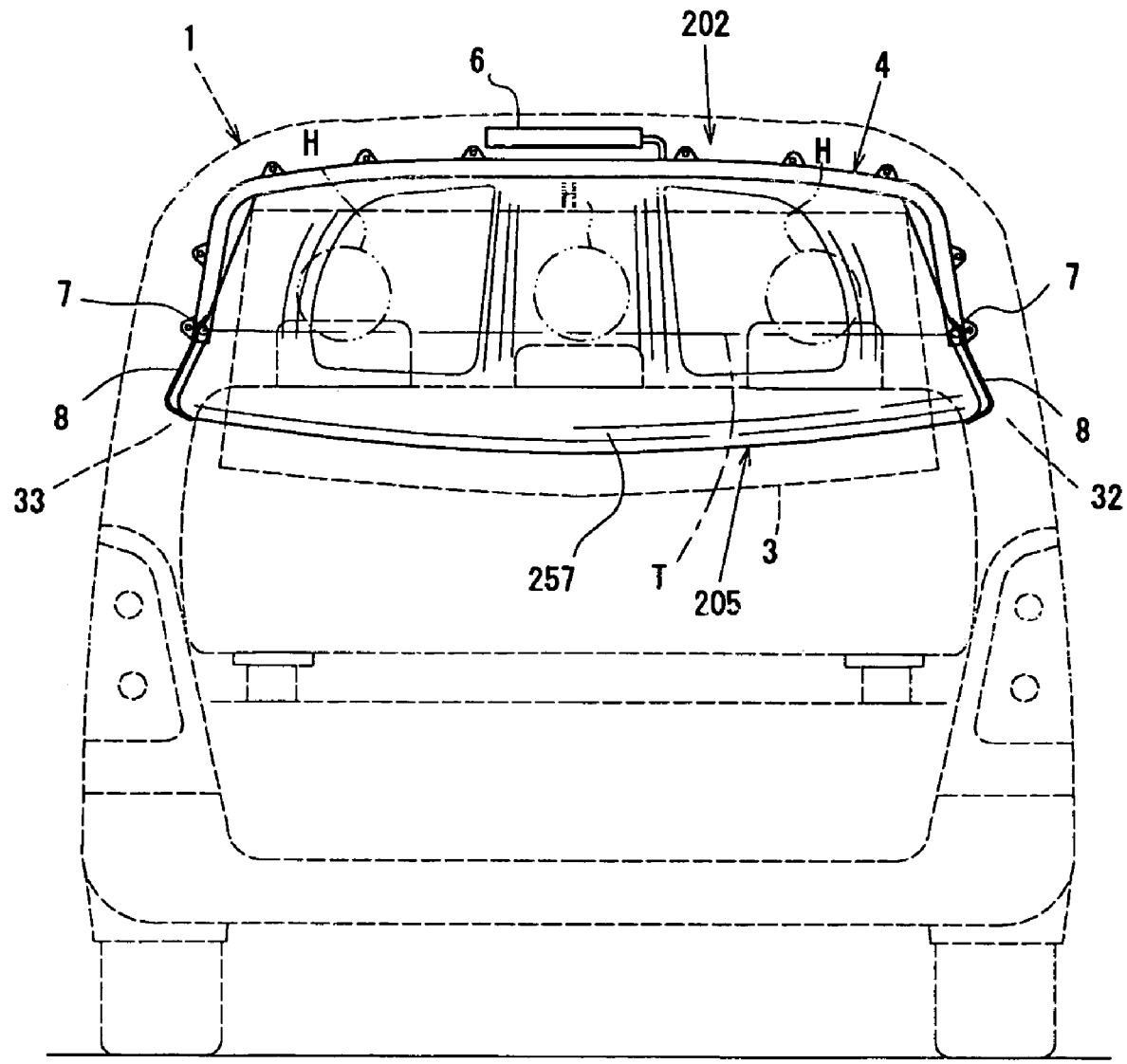
FIG. 10 is a back view of a vehicle showing an embodiment 3.

Herein, the central inflatable portions 453, 454 are located, as shown in FIG. 10, in such a manner that part of the front-side portion 453 overlaps the B pillar 422, the lower edge of the front window 411 and the lower edge of the rear window 412, and that part of the rear-side portion 454 overlaps the C pillar 423, the lower edge of the rear window 412 and the lower edge of the quarter window 413.

As described above, according to the present embodiment, the inflatable portions 451, 452, 453, 454 are configured so as to extend downward beyond the belt line L such that the lower-end portions 451a, 452a, 453a, 454a engage with the lower edges of the windows 411, 412 and 413, and that the central inflatable portions 453, 454 engage with the B pillar 422 and the C pillar 423. Thus, the sufficient tension can be provided at the entire area of the curtain portion 405 despite the large curtain portion 405 covering the large side window 410.

Also, since the central inflatable portions 453, 454 and the rear-located side inflatable portion 452 are located at the positions corresponding to the occupant's head H, the impact absorption for the head H can be improved.

Further, since the tension line T interconnecting the support pins 7, 7 is formed below the occupant's head H, the occupant's head H can be prevented from moving outside the vehicle, thereby improving the occupant protection.

Other functions are the same as those of the previous embodiments.

Embodiment 6

Figure 13:
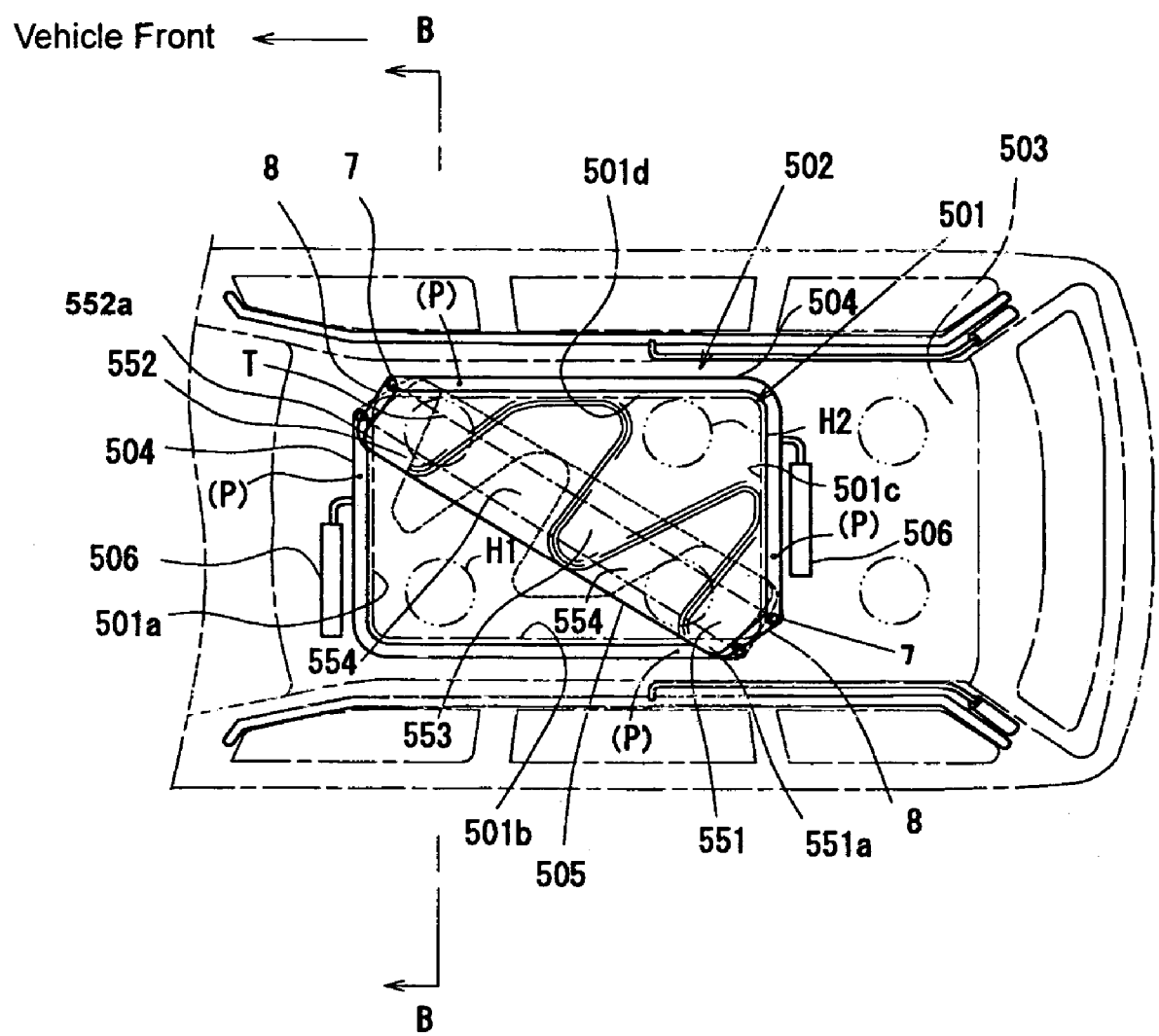
FIG. 13 is a plan view of a vehicle showing an embodiment 6.
Figure 14:
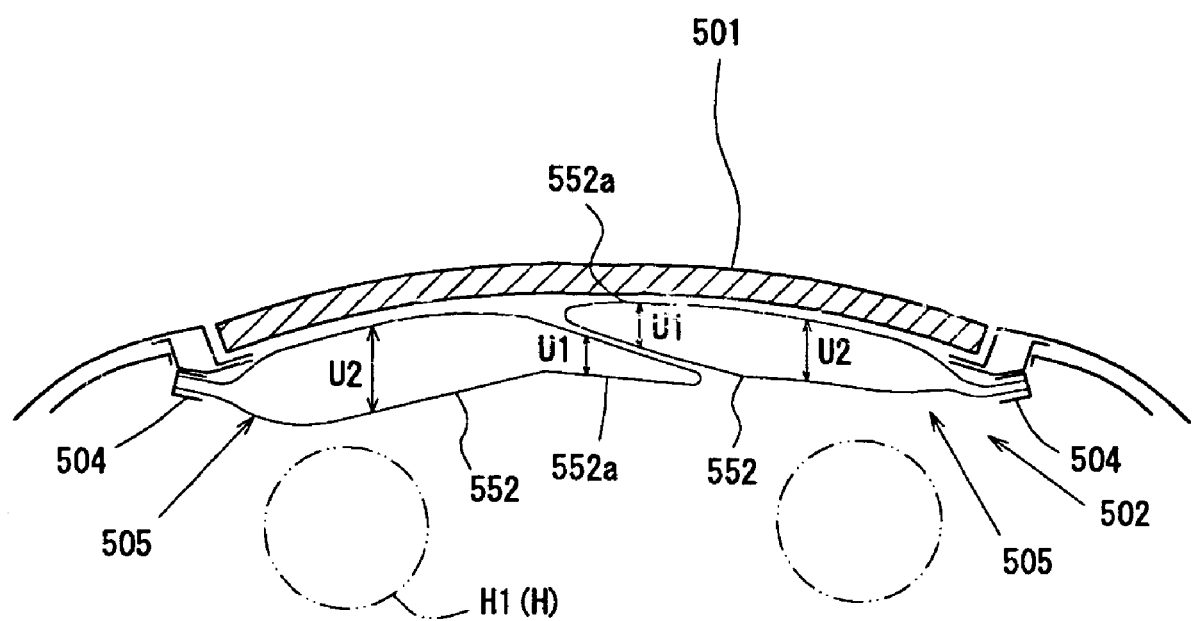
FIG. 14 is a sectional view taken along line B-B of FIG. 13.

Next, the curtain airbag device according to another embodiment 6 will be described referring to FIGS. 13, 14. A curtain airbag device 502 of the present embodiment is provided at a glass-roof window 501 located at the vehicle roof. FIG. 13 is a plan view of the vehicle equipped with the curtain airbag device 502. FIG. 14 is a sectional view along line B-B of FIG. 13.

The curtain airbag device 502 operates the curtain portion so as to cover the glass-roof window 501 when the vehicle rollover is detected or predicted by the airbag sensor (not illustrated), thereby preventing the occupant from moving outside the vehicle.

The glass-roof window 501 is formed at the center of a roof 503, specifically above a front-seat occupant H1 and a first rear-seat occupant H2, through which the occupant can have an outside view in the normal state (when the curtain portion is in the folded state). FIG. 13 shows the curtain portion in the inflated state.

The curtain airbag device 502 comprises two inflators 506, 506, curtain portions 505, 505 and base casing 504, 504, respectively. The curtain portions 505, 505 are inflated inside the glass-roof window 501 so as to cover the glass-roof window 501.

One of the inflators 506, 506 is disposed in front of the window 501 and the other is disposed behind that. One of the base casing 504, 504 is disposed along a front-side edge 501a and a left-side edge 501b of the window 501, and the other is disposed along a rear-side edge 501c and a right-side edge 501d of the window 501.

At the base casing 504, 504 are respectively provided curtain portions 505, 505 that are inflated in a substantially triangle shape.

Each curtain portion 505 has inflatable portions 551, 552, 553 to be inflated by the gas from the inflator 506 at both sides and the center thereof. Between these portions are formed non-inflatable portion 554, and at both sides of these portions are provided bands 8, 8.

The bands 8, 8 are formed so as to engage respectively with the support pins 7, 7 provided at both-side ends of the base casing 504, like the embodiment 1. When the curtain portion 505 is inflated, the tension portion P, P of the curtain portion 505 is moved to the position of the support pins 7, 7 and engage with them.

Also, two curtain portions 505, 505 are formed so as to overlap each other at the center portion of the glass-roof window 501 in the inflated state thereof.

For this purpose, respective tip portions 552a, 552a of the inflatable portions 552, 552 of the curtain portions 505, 505 are formed to be so thin (thickness U1), as shown in FIG. 13, that the two portions 505, 505 do not interfere with each other at the time they are inflated.

Meanwhile, portions of the curtain portions 505, 505 that are located above the occupant's head H have a specified thickness (thickness U2) to properly absorb the crash impact against the occupant's head H.

Also, in order to avoid the interference at the inflation, the upper-located curtain portion 505 is configured so as to be inflated before the lower-located one is inflated.

Accordingly, the proper inflation of the two curtain portions 505, 505 can be attained without the interference, so the occupant protection can be obtained properly.

In the present embodiment, the support positions (fixed positions) of the curtain portions 505, 505 are properly moved with the bands 8, 8 and the support pins 7, 7, thereby generating the tension properly.

Thus, the tension can be surely provided at the curtain airbag device 502 disposed at the glass-roof window 501, thereby improving the occupant protection.

Herein, according to the present embodiment, the inflatable portions 505, 505 are configured such that their front-end portions 551a, 552a extend to the edges 501a, 501b, 501c, 501d of the glass-roof window 501. Thus, the tension can be provided at the inflation-front side before the tension line T.

Other functions are the same as those of the previous embodiments.

Embodiment 7

Next, the curtain airbag device according to another embodiment 7 will be described referring to FIG. 15A. A curtain airbag device 602 of the present embodiment is also provided at the glass-roof window 501 located at the vehicle roof.

The curtain airbag device 602, unlike the embodiment 6, comprises a single inflator 606, a single curtain portion 605 and a single base casing 604, and the glass-roof window 501 is covered by the single curtain portion 605.

Specifically, the substantially U-shaped base casing 604 is disposed along the front-side edge 501a and the left-side edge 501b of the glass-roof window 501, and the curtain portion 605 is accommodated within the base casing 604. The inflator 606 to supply the gas to the curtain portion 605 is provided in front of the base casing 604.

Figure 15A:
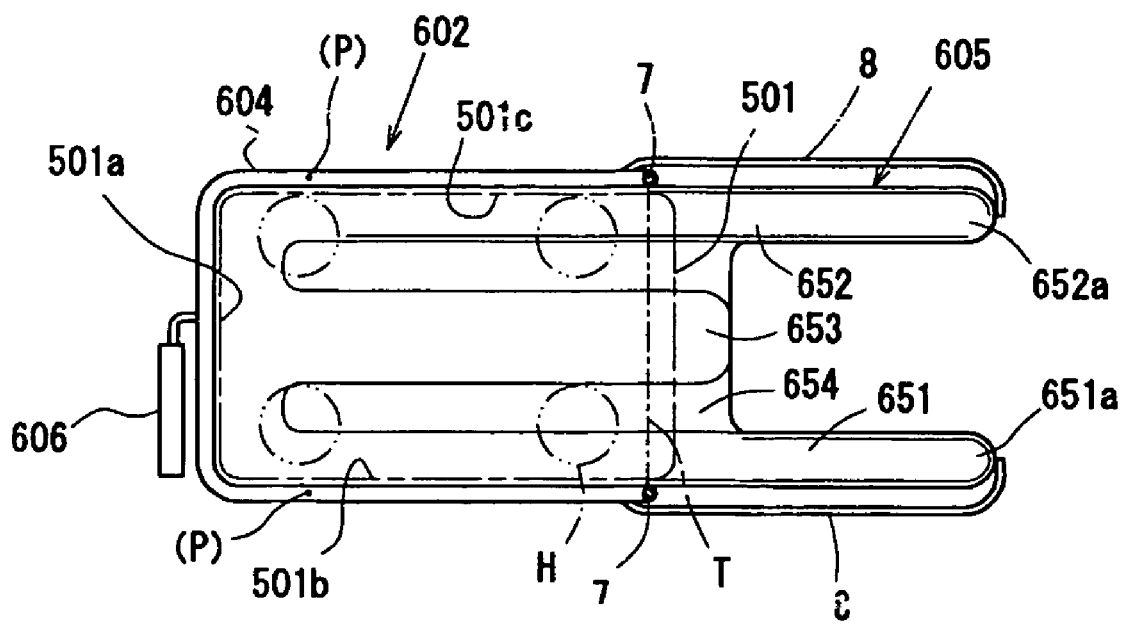
FIG. 15A is a plan view showing an embodiment 7.
Figure 15B:
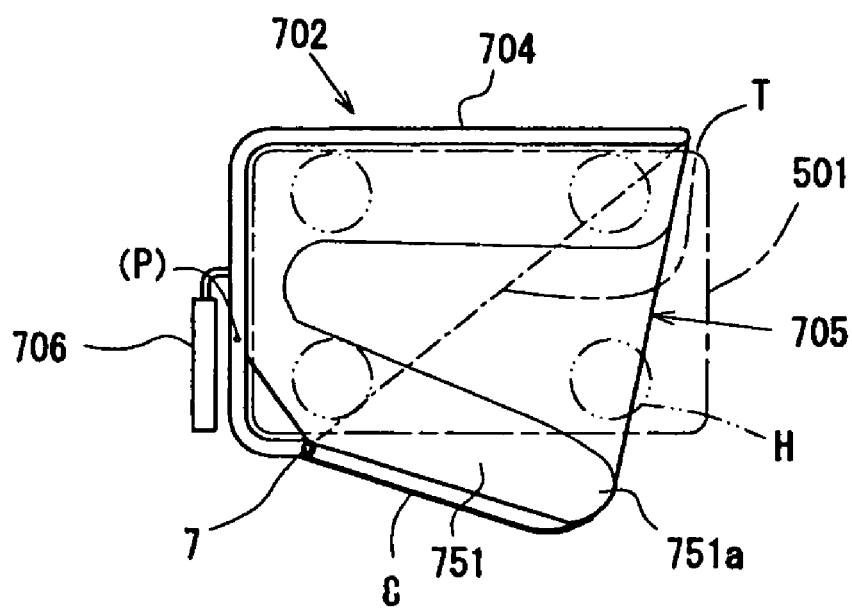
FIG. 15B is a plan view showing an embodiment 8.

FIG. 15B shows the curtain portion 605 in the inflated state.

Like the previous embodiment, the bands 8, 8 are formed at the side of the curtain portion 605 and the support pins 7,7 are provided at the both sides of the base casing 604. Likewise, the support positions (fixed positions) of the curtain portions 605 are moved rearward by the inflation of the inflatable portions 651, 652. In the present embodiment, the curtain portion 605 is fixed to the casing 604 before the P point in FIG. 15A.

The curtain portion 605 of the present embodiment has a different shape from the previous embodiment.

Namely, as shown in FIG. 15A, the curtain portion 605 is configured in such a manner that its both side inflatable portions 651, 652 with the bands 8, 8 extend rearward greatly, and the central portion 653 and an non-inflatable portion 654 have a short length to just cover the glass-roof window 501.

By the above-described structure, the side inflatable portions 651, 652 can be used as not only a promotion means for moving the fixed position (support position) of the curtain portion 605, but an impact absorption member. Also, the curtain portion 605 can be made small, so it can be properly accommodated.

Accordingly, the present embodiment, like the previous embodiment, has the effect of generating the tension with the small inflatable portions and the small volume of gas, and the fixed position of the curtain portion 605 can be surely moved by the inflatable portions 651, 652. Additionally, the accommodation space can be made compact.

Also, by forming the large inflatable portions 651, 652 and extending the front-end portions 651a, 652a rearward as described above, the tension can be provided at the inflation-front side (vehicle rear side) of the curtain portion 605 before the tension line T.

Other functions are the same as those of the previous embodiments.

Embodiment 8

Next, the curtain airbag device according to another embodiment 8 will be described referring to FIG. 15B. A curtain airbag device 702 of the present embodiment is also provided at the glass-roof window 501 located at the vehicle roof.

The curtain airbag device 702, like the embodiment 7, comprises a single inflator 706, a single curtain portion 705 and a single base casing 704, and the glass-roof window 501 is covered by the single curtain portion 705.

The curtain airbag device 702, however, has the band 8 at one side of the curtain portion 705, and the support pin 7 is provided at one end of the base casing 704. Thus, this device 702 is comprised of a triangle type of curtain airbag that is shown in FIG. 8.

Accordingly, since the only one side of the curtain portion 705 is moved along the inflation of an inflatable portion 751, the inflation of the curtain airbag requires a relatively small inflation force that would be enough to inflate the single side, compared with the previous embodiments 6, 7. Thus, it would not be necessary to make the inflatable portion 751 large, and therefore the inflation of the curtain portion 705 can be properly attained with the relatively small-sized inflatable portion 751.

Thereby, it is also unnecessary to supply a large volume of inflatable gas from the inflator 706, and the curtain portion 705 can be made compact.

Thus, the proper tension can be provided at the curtain portion 705 with a relatively simple and low-cost device according to the present embodiment.

Herein, according to the present embodiment, the inflatable portion 705 is configured such that the front-end portion 751a extends to the peripheral edge of the glass-roof window 501. Thus, the tension can be provided at the inflation-front side (vehicle rear side) before the tension line T like the other embodiments.

Other functions are the same as those of the previous embodiments.

Herein, the correspondence of component elements between the present invention and the above-described embodiments is as follow. Namely, the window of the present invention corresponds to the back window 3, the front window 411, rear window 412 and quarter window 413, and the glass-roof window 501. Likewise, the gas supply device corresponds to the inflators 6, 406, 506, 606, 706. The tip portion corresponds to the tip portion Q. The support portion corresponds to the support pin 7. The front-end portion of the inflatable portion corresponds to the lower-end portions 51a, 52a, 53a, 451a, 452a, 453a, 454a, and the front-end portions 551a, 552a, 651a, 652a, 751a.

However, the present invention should not be limited to the above-described embodiments, but can include any other embodiments of the curtain airbag device.

For example, the present invention includes the curtain airbag device that can be applied to buildings, air crafts, trains, ships, space vehicles, space stations etc., other than the vehicle. Also, the window to which the curtain airbag device of the present invention is applicable may have any shapes, such as triangle, tetragon, pentagon, or circle.

Further, the tension portion of the curtain portion may be supported by a support hook, a support hole etc., instead of the support pin. Also, the axis direction of the support pin may be set to be in parallel or slant to the inflation direction of the curtain portion, instead of being perpendicular to that.

Also, any types of band may be used, such as a rope type or belt type.

What is claimed is:

1. A curtain airbag device, comprising:
    a curtain portion provided at a window, the curtain portion being configured so as to be fixed to at least a window side at a portion thereof, accommodated at a peripheral portion of the window in a folded state thereof and cover the window in an inflated state thereof; and
    a gas supply device operative to supply gas to an inflatable portion of said curtain portion to inflate said curtain portion in a specified condition,
    wherein said curtain portion includes a tip side portion that is located at a tip of a side portion thereof and a tension portion that is located at the side portion thereof away from the tip side portion, said curtain portion in the folded state is accommodated in such a manner that the tip side portion is positioned near a support portion that is provided at a window edge and the tension portion is positioned near said window side to which the curtain portion is fixed, and said curtain portion is configured such that when the curtain portion is inflated with the inflation of the inflatable portion, the tip side portion is moved in an inflation direction and the tension portion is moved to the support portion so as to engage with the support portion, wherein said curtain portion is configured so as to be fixed to a first window side at a portion thereof and accommodated at the first window side, a second window side and a third window side, the second and third window sides being located at both sides of the first window side, said curtain portion includes a second-window-side tip side portion that is located at a tip of a side portion thereof located at a side of the second window side and a third-window-side tip side portion that is located at a tip of a side portion thereof located at a side of the third window side, and a second-window-side tension portion that is located at the side portion thereof at the side of the second window side away from the second-window-side tip side portion and a third-window-side tension portion that is located at the side portion thereof at the side of the third window side away from the third-window-side tip side portion, said curtain portion in the folded state is accommodated in such a manner that the second-window-side tip side portion is positioned near a second-window-side support portion that is provided at the second window side and the third-window-side tip side portion is positioned near a third-window-side support portion that is provided at the third window side, and the second-window-side tension portion and the third-window-side tension portion are positioned near the first window side, and said curtain portion is configured such that when the curtain portion is inflated with the inflation of the inflatable portion, the second-window-side and third-window-side tip side portions are moved in the inflation direction, respectively, and the second-window-side and third-window-side tension portions are moved to the second-window-side and third-window-side support portions so as to engage with the second-window-side and third-window-side support portions, respectively.

2. The curtain airbag device of claim 1, wherein an angle formed between said window side to which the curtain portion is fixed and an adjacent window side is configured to be obtuse.

3. The curtain airbag device of claim 1, wherein said tip side portion and said tension portion are interconnected by a band, and the band is provided so as to become away from said window side to which the curtain portion is fixed.

4. The curtain airbag device of claim 3, wherein said band is provided at an outer side of said curtain portion in the folded state.

5. The curtain airbag device of claim 1, wherein said curtain portion has a lobe portion at which a slot is formed, and said tip side portion and said tension portion are connected by said lobe portion and said support portion engages with the slot.

6. The curtain airbag device of claim 1, wherein said window is a vehicle window, and said specified condition includes at least a vehicle-crash detection, a vehicle-crash prediction, or a vehicle-rollover detection.

7. The curtain airbag device of claim 6, wherein said support portion forms a tension line at the curtain portion when the curtain portion is inflated, and the tension line is formed at a location in which a center of an occupant's head is located at a side of said window side to which the curtain portion is fixed relative to the tension line.

8. The curtain airbag device of claim 1, wherein said inflatable portion is formed near said tension portion.

9. The curtain airbag device of claim 1, wherein said inflatable portion is formed on a tension line of the curtain portion that is formed by said tension portion.

10. The curtain airbag device of claim 1, wherein said inflatable portion has a tip portion, and when the curtain portion is inflated, the tip portion of the inflatable portion extends beyond a window side other than said first, second and third window sides.

11. The curtain airbag device of claim 10, wherein an angle formed between said window side to which the curtain portion is fixed and an adjacent window side is configured to be obtuse.

12. The curtain airbag device of claim 10, wherein said inflatable portion is configured so as to be inflated in a substantially pole shape, extending beyond said window side.

13. The curtain airbag device of claim 12, wherein said inflatable portion is inflated in the substantially pole shape so as to be located close to either one of said second and third window sides.

14. The curtain airbag device of claim 10, wherein said window is a side window provided at a vehicle side, said specified condition includes at least a vehicle-crash detection, a vehicle-crash prediction, or a vehicle-rollover detection, and said inflatable portion is configured so as to be inflated, extending from the first window side located at an upper side of the vehicle beyond a belt line of a lower window side of the side window, in such a manner that the inflatable portion in the inflated state overlaps with a vertically-extending window pillar of the vehicle.

* * * * *